(12) United States Patent
Ho et al.

(10) Patent No.: US 8,070,990 B2
(45) Date of Patent: Dec. 6, 2011

(54) SMOKE SUPPRESSANTS

(75) Inventors: Wai-Kwong Ho, North Olmsted, OH (US); Joseph K. Walker, Mentor, OH (US)

(73) Assignee: J.M. Huber Corporation, Atlanta, GA (US)

( * ) Notice: Subject to any disclaimer, the term of this patent is extended or adjusted under 35 U.S.C. 154(b) by 422 days.

(21) Appl. No.: 11/934,427

(22) Filed: Nov. 2, 2007

(65) Prior Publication Data

US 2011/0031454 A1    Feb. 10, 2011

Related U.S. Application Data

(60) Provisional application No. 60/864,317, filed on Nov. 3, 2006.

(51) Int. Cl.
*C09K 21/02* (2006.01)
*C09K 21/00* (2006.01)
*C08K 3/10* (2006.01)

(52) U.S. Cl. ............... 252/609; 252/601; 524/406

(58) Field of Classification Search .......... 252/609
See application file for complete search history.

(56) References Cited

U.S. PATENT DOCUMENTS

| | | | |
|---|---|---|---|
| 3,726,694 A | 4/1973 | Moore | |
| 3,969,127 A | 7/1976 | Robitaille | |
| 4,098,753 A | 7/1978 | Tsigdinos | |
| 4,670,494 A | 6/1987 | Semenza | |
| 4,680,334 A | 7/1987 | Wallace | |
| 4,762,700 A | 8/1988 | Huggins | |
| 4,965,309 A | 10/1990 | Batdorf | |
| 5,227,417 A | 7/1993 | Kroushl | |
| 5,494,718 A * | 2/1996 | Adams et al. | 428/35.7 |
| 5,886,072 A * | 3/1999 | Linsky et al. | 524/145 |
| 6,043,312 A | 3/2000 | Fagher | |
| 2004/0122149 A1 | 6/2004 | Kakakia | |
| 2006/0014874 A1 | 1/2006 | Ito | |

FOREIGN PATENT DOCUMENTS

EP        0708143 B1      1/2000
WO    WO 2004041930 A1 *  5/2004

OTHER PUBLICATIONS

Climax Molybdenum web site, 2004, accessed from http://web.archive.org/web/20050306020006/www.climaxmolybdenum.com/Products/Chemical/ on Jul. 24, 2009.*

* cited by examiner

Primary Examiner — Peter F Godenschwager
(74) Attorney, Agent, or Firm — Ballard Spahr LLP

(57) ABSTRACT

The present invention is directed to smoke suppressants based on ammonium octamolybdate chemistry. According to this invention, the precipitation of ammonium octamolybdate in the presence of an inert mineral core produce a novel high surface area ammonium octamolybdate smoke suppressant. The high surface area significantly increases the smoke suppression performance over a standard ammonium octamolybdate. This invention is also directed to a process for making the high surface area ammonium octamolybdate smoke suppressant. The smoke suppressant of this invention is particularly suitable for smoke suppression in polyvinyl chloride (PVC) applications.

11 Claims, 9 Drawing Sheets

SEM of an AOM Smoke Suppressant of this Invention

SEM of a Commercial AOM

SEM of an AOM Smoke Suppressant of this Invention

Ninety second NBS smoke density for KG-STA and commercial AOM.

Four minute NBS smoke density for KG-STA and commercial AOM.

Maximum smoke density for KG-STA and commercial AOM.

Ninety second NBS smoke density for KG-STA and commercial AOM.

Four minute NBS smoke density for KG-STA and commercial AOM.

Maximum smoke density for KG-STA and commercial AOM.

Cone total smoke for KG-STA and commercial AOM.

Ninety-second smoke reduction for KG-STA and commercial AOM.

Four minute NBS smoke density for KG-STA, and commercial AOM.

Maximum NBS smoke density for KG-STA, and commercial AOM.

Total Smoke for KG-STA and commercial AOM in Rigid PVC at 75 kW/m$^2$.

US 8,070,990 B2

SMOKE SUPPRESSANTS

CROSS-REFERENCE TO RELATED APPLICATION

This application claims the benefit of U.S. provisional patent application No. 60/864,317 filed on Nov. 3, 2006, the entirety of which is hereby incorporated by reference.

This invention generally relates to a novel high surface area ammonium octamolybdate (AOM) based smoke suppressant that can be used in thermoplastic compositions and other polymeric materials. The high surface area AOM material is prepared by controlled reaction of ammonium dimolybdate and molybdenum trioxide in the presence of an inert core material. Precipitation of ammonium octamolybdate in the presence of an inert core material promotes a rod-like morphology of AOM. The formation of discreet rods, rather than agglomerates, results in a surface area 1.5 to 2.5 times greater than that of commercial ammonium octamolybdates. Because of its high surface area, the AOM precipitation technology is more effective at lower use levels than conventional AOM in both flexible and rigid PVC compounds.

BRIEF DESCRIPTION OF THE DRAWINGS

Detailed Description of Illustrated Embodiments

Figure 1:
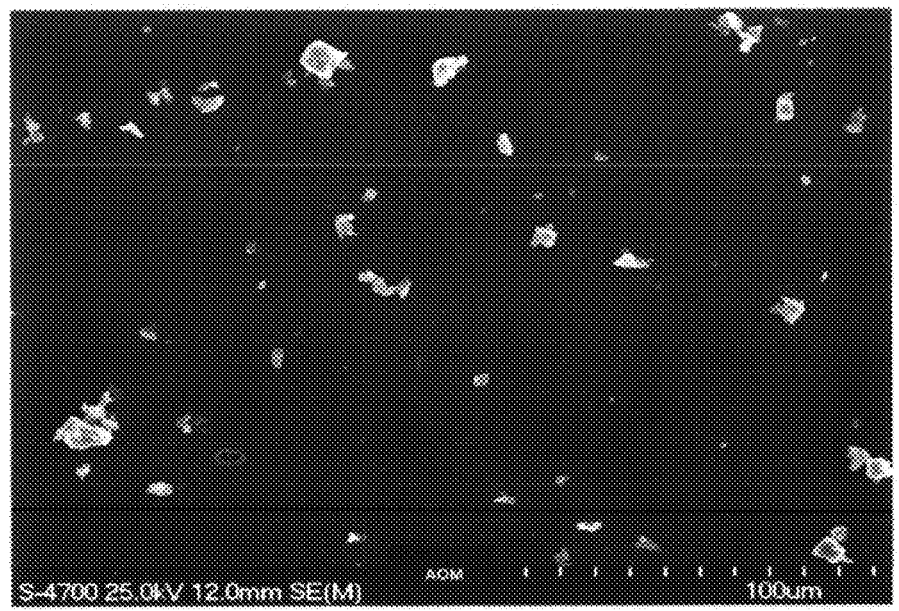

FIG. 1 is a scanning electron micrograph image of a commercial AOM showing the AOM in the form of irregularly shaped agglomerates.

Figure 2:
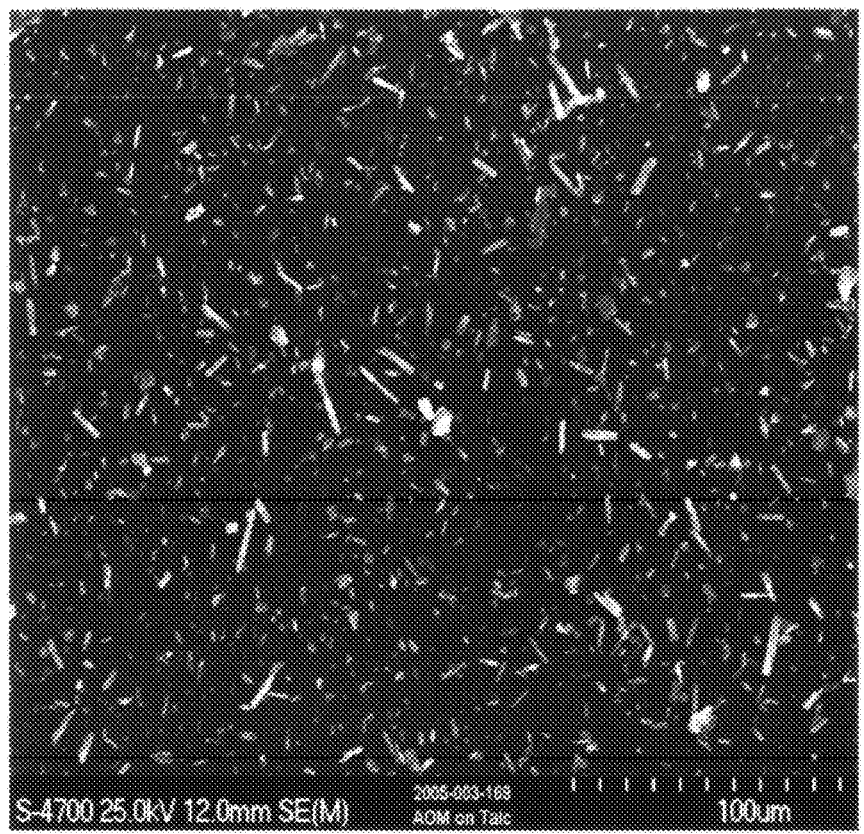

FIG. 2 is a scanning electron micrograph image of a high surface area AOM-talc smoke suppressant showing the AOM in the form of distinct rods. Precipitation of ammonium octamolybdate in the presence of talc promotes the formation of rods rather than agglomerates.

Figure 3:
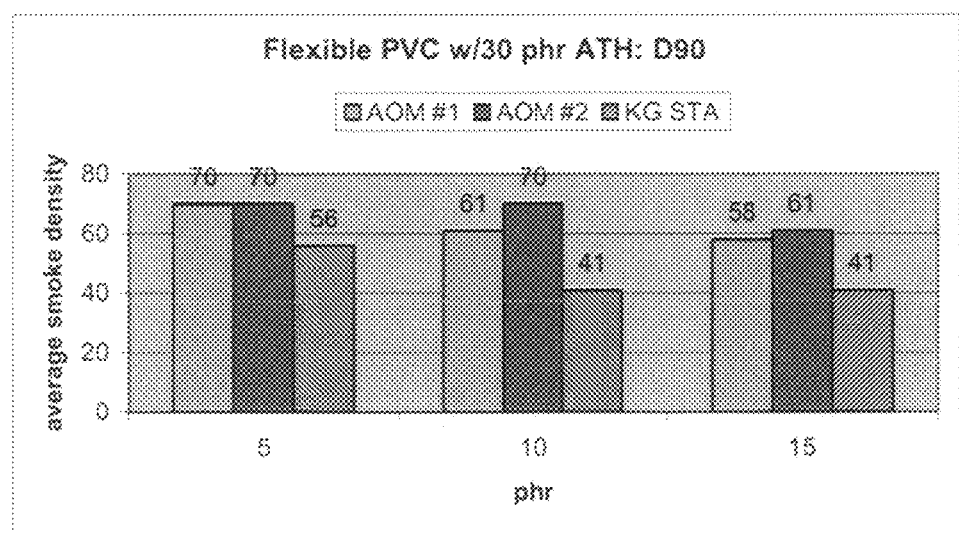

FIG. 3 is a bar graph representing comparative NBS average smoke density results at 90 seconds obtained from flexible PVC formulated with 30 phr aluminum trihydrate and 5, 10 and 15 phr AOM of either commercial AOM or high surface area AOM.

Figure 4:
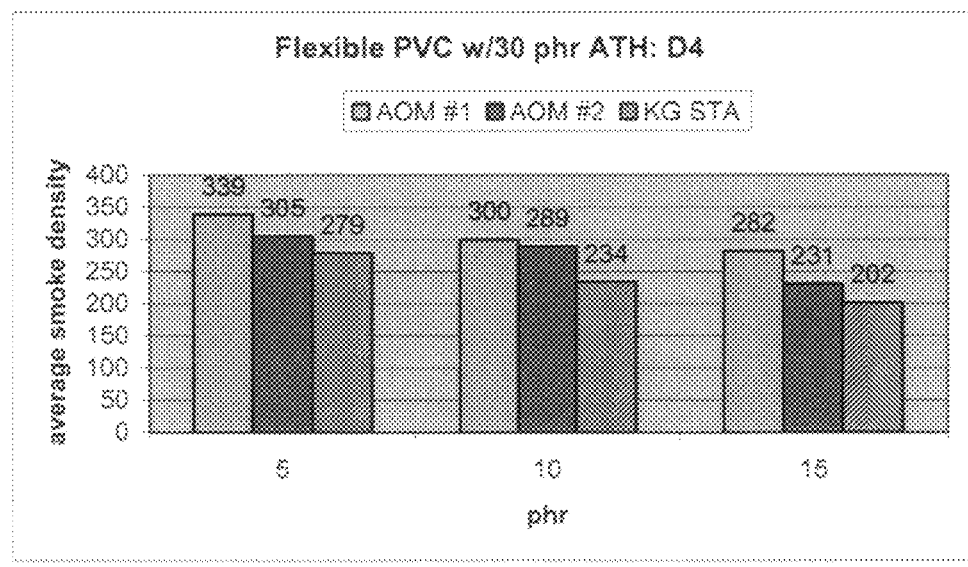

FIG. 4 is a bar graph representing comparative NBS average smoke density results at 4 minutes obtained from flexible PVC formulated with 30 phr aluminum trihydrate and 5, 10 and 15 phr AOM of either commercial AOM or high surface area AOM.

Figure 5:
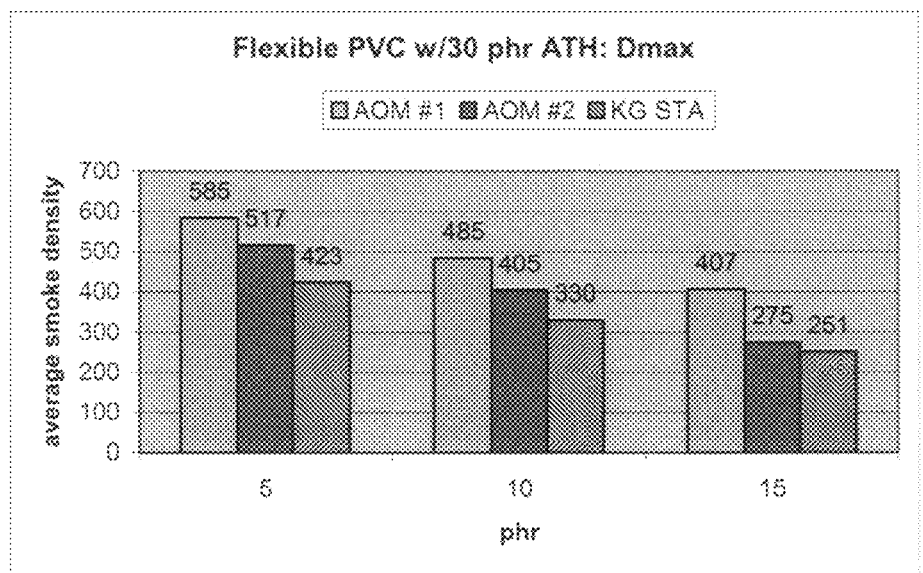

FIG. 5 is a bar graph representing comparative NBS average smoke density results at maximum smoke development obtained from flexible PVC formulated with 30 phr aluminum trihydrate and 5, 10 and 15 phr AOM of either commercial AOM or high surface area AOM.

Figure 6:
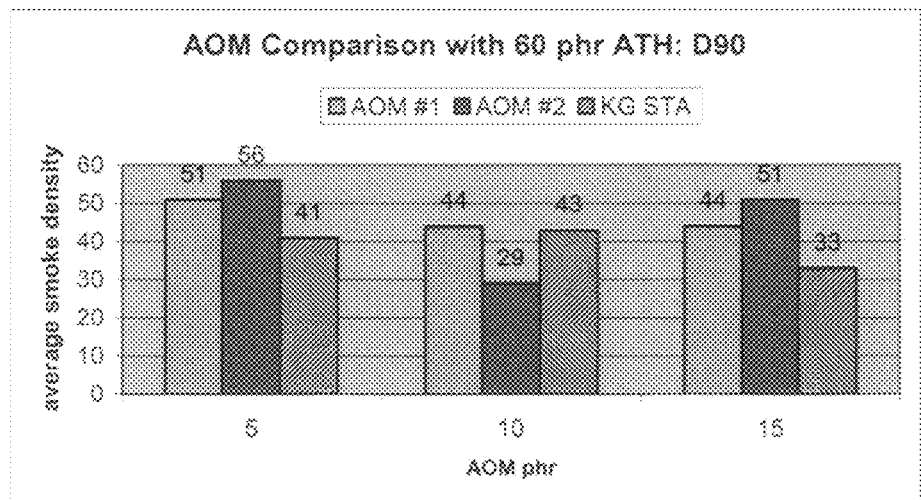

FIG. 6 is a bar graph representing comparative NBS average smoke density results at 90 seconds obtained from flexible PVC formulated with 60 phr aluminum trihydrate and 5, 10 and 15 phr AOM of either commercial AOM or high surface area AOM.

Figure 7:
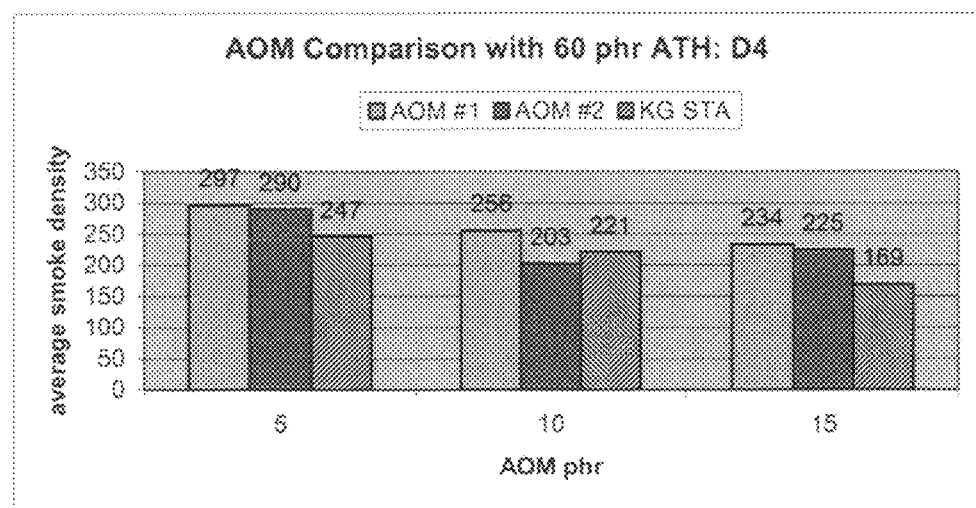

FIG. 7 is a bar graph representing comparative NBS average smoke density results at 4 minutes obtained from flexible PVC formulated with 60 phr aluminum trihydrate and 5, 10 and 15 phr AOM of either commercial AOM or high surface area AOM.

Figure 8:
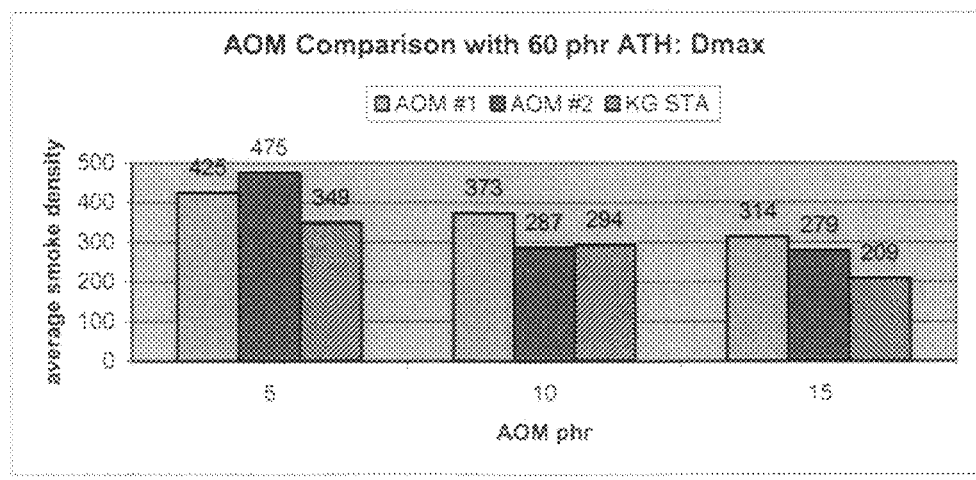

FIG. 8 is a bar graph representing comparative NBS average smoke density results at maximum smoke development obtained from flexible PVC formulated with 60 phr aluminum trihydrate and 5, 10 and 15 phr AOM of either commercial AOM or high surface area AOM.

Figure 9:
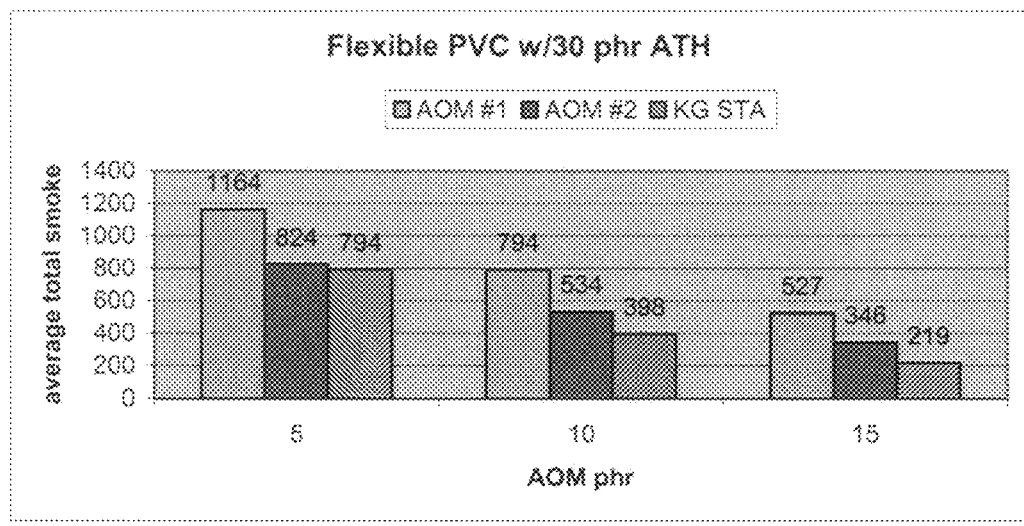

FIG. 9 is a bar graph representing comparative cone calorimeter smoke density results obtained from flexible PVC formulated with 30 phr aluminum trihydrate and 5, 10 and 15 phr AOM of either commercial AOM or high surface area AOM.

Figure 10:
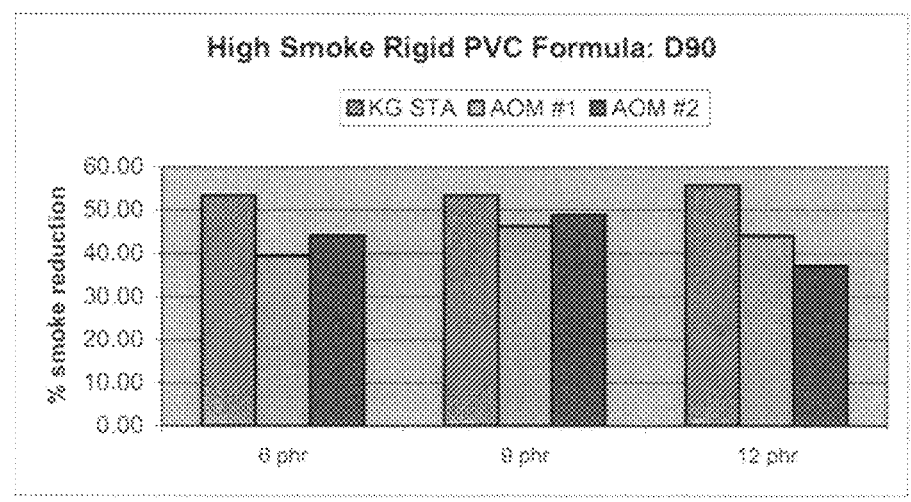

FIG. 10 is a bar graph representing comparative NBS average percent reduction in smoke density results at 90 seconds obtained from rigid PVC formulated with 6, 9 and 12 phr AOM of either commercial AOM or high surface area AOM.

Figure 11:
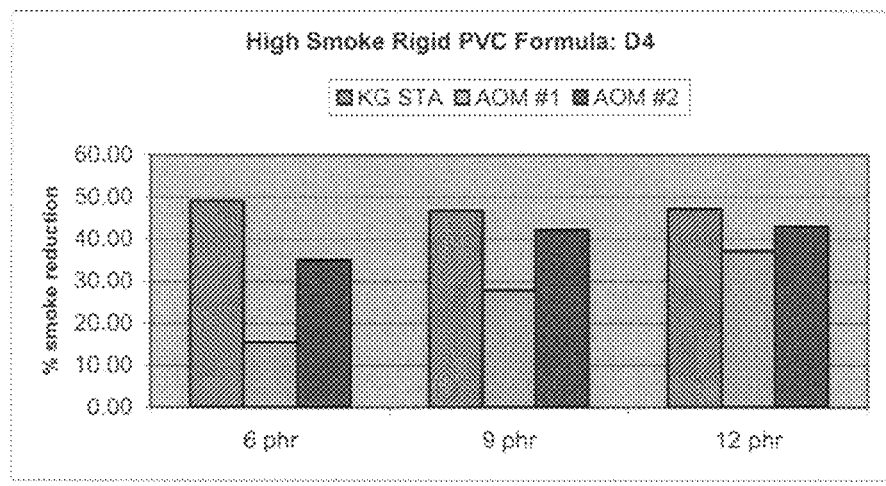

FIG. 11 is a bar graph representing comparative NBS average percent reduction in smoke density results at 4 minutes obtained from rigid PVC formulated with 6, 9 and 12 phr AOM of either commercial AOM or high surface area AOM.

Figure 12:
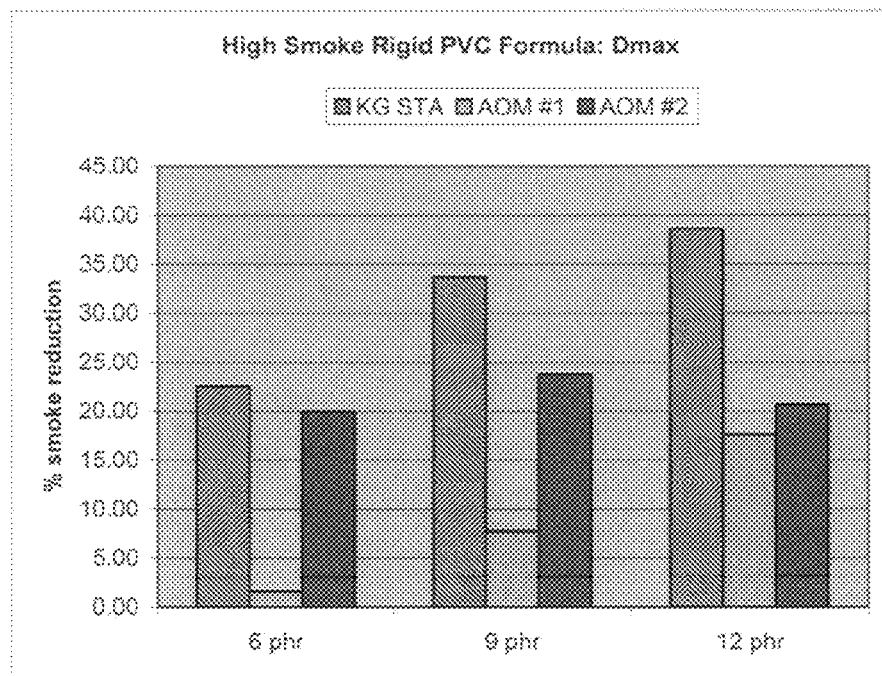

FIG. 12 is a bar graph representing comparative NBS average percent reduction in maximum smoke density obtained from rigid PVC formulated with 6, 9 and 12 phr AOM of either commercial AOM or high surface area AOM.

Figure 13:
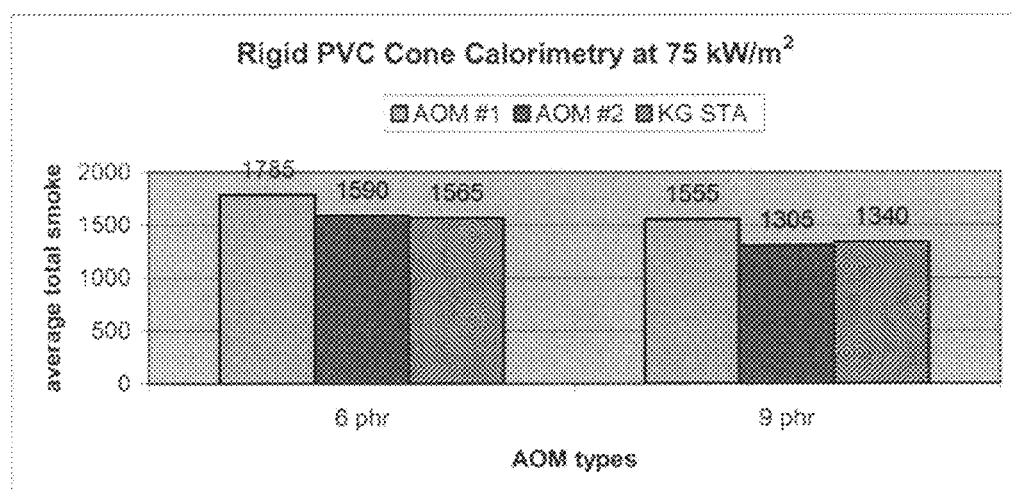

FIG. 13 is a graph representing of the total smoke generated from the combustion of rigid PVC formulated with 6 and 9 phr of KG-STA and two commercial AOM materials.

DESCRIPTION OF THE INVENTION

The present invention is directed to a novel high surface area molybdate smoke suppressant. Inorganic molybdates are the industry standard for smoke suppression based on their inherent capability of promoting char formation. According to this invention, the effectiveness of smoke suppression can be strongly enhanced by the increased surface area of the molybdate additive.

This invention is also directed to the preparation of a novel high surface area molybdate smoke suppressant. The process involves controlled precipitation of AOM on an inert mineral core. The AOM material on the inert core increases the surface area of the active chemistry and reduces the total demand for molybdenum in a polymer (for example, PVC) compound. In accordance with this invention, the high surface area AOM significantly increases the smoke suppression performance over a standard ammonium octamolybdate.

High surface area AOM, hereinafter "KG-STA," can be prepared by an in situ reaction of ammonium dimolybdate and molybdenum trioxide in the presence of an inert base pigment, such as talc. In one embodiment, the surface treatment of an inert core with AOM can include an in-situ reaction comprising the steps of:

(1) charging an inert base pigment into hot water;
(2) addition of ammonium dimolybdate (ADM) and molybdenum trioxide ($MoO_3$) in a stoichiometric molar ratio of 2:4;
(3) holding the slurry at between about 88° C. and 95° C. for about 3-5 hours;
(4) filtering;
(5) drying; and
(6) grinding.

Pigments that can be used for this invention include talc, for example, Microtalc® powdered talc (available from Specialty Minerals, Inc., Bethlehem, Pa.), silica, clay, or any pigment that can be used as filler in polymers (such as PVC) and do not interfere with the ammonium dimolybdate/molybdenum trioxide reaction. The incorporation of ammonium dimolybdate (ADM) and molybdenum trioxide can be added in sequential order or simultaneously (i.e., regardless of order) at specified rates.

The dried powder can be milled using a Netzch grinder. The AOM content can be in the range of 20% to 85% by weight, and the inert core material can be range of 15% to 80% by weight, based on the total weight of the smoke suppressant material.

The precipitation of ammonium octamolybdate in the presence of talc promotes the formation of rods rather than irregularly shaped agglomerates. As measured by the BET method, the rod-like structure of AOM in KG-STA has higher surface area than commercial AOM materials. The surface area of a blended material can be considered an additive property.

For KG-STA, the experimentally determined BET surface area is 7.0 m$^2$/gm, and the AOM contribution is calculated to be 4.09 m$^2$/gm. Therefore, the ammonium octamolybdate of KG-STA is determined to have a surface area 1.5 to 2.5 times higher than the two commercial grades of AOM.

Table 1 shows the BET surface area values of KG-STA and commercial AOM products (AOM #1 and AOM #2).

TABLE 1

| BET Surface Area Measurements | | |
| --- | --- | --- |
| KG-STA (m$^2$/gm) | AOM #1 (m$^2$/gm) | AOM #2 (m$^2$/gm) |
| 7.0 | 1.6 | 2.9 |

Another aspect of this invention is a thermoplastic polymer comprising a high surface area AOM. The thermoplastic polymer composition comprises a chlorine-containing polymer and a smoke suppressant compound comprising (a) from about 15% to about 80% by weight of an inert core material such as talc, silica, or clay; and (b) from about 20% to about 85% by weight of an ammonium octamolybdate, both based on the weight of the smoke suppressant compound.

In yet another aspect of this invention is a method of improving the smoke suppressant characteristics of a polymeric composition. The method comprises (a) preparing a smoke suppressant material comprising from about 20% to about 85% by weight of an ammonium octamolybdate, 15% to 80% of an inert core material such as talc, silica, or clay, and (b) compounding the smoke suppressant material with a formula of a polymeric formulation. An example of a polymeric formulation is polyvinyl chloride. In one embodiment, the thermoplastic polymer is a flexible polyvinylchloride (PVC). Although polyvinylchloride is inherently flame retarding, the use of plasticizers to achieve PVC flexibility has resulted in increased flammability of the material. In another embodiment, the thermoplastic polymer is a rigid polyvinylchloride.

A base formula of a typical flexible polyvinyl chloride is shown in Table 2:

TABLE 2

| Base formula of a typical flexible PVC. | |
| --- | --- |
| Oxyvinyl 240 F PVC Resin | 100 |
| Halstab H-695 thermal stabilizer | 7 |
| Sb$_2$O$_3$ flame retardant (synergist) | 3 |
| Micral 9400 (Aluminum trihydrate) | 30 |
| Santicizer 2148 Plasticizer | 20 |
| Uniplex FRP-45 Plasticizer | 20 |

Table 3 illustrates a rigid PVC formulation.

TABLE 3

| Rigid PVC formulation. | |
| --- | --- |
| Oxvinyl 240F PVC Resin | 100 |
| Mark 1900 thermal stabilizer | 3 |
| Halstab 1214 acid scavenger | 1 |
| Sb$_2$O$_3$ flame retardant | 2 |
| Calcium Stearate | 1 |
| Paraloid K120N acrylic modifier | 1 |
| Paraloid K175 acrylic modifier | 1 |
| Mg(OH)$_2$ | 8 |
| Talc | 12 |

For example, flexible PVC containing the smoke suppressant of this invention can be made by blending 30 phr or 60 phr (parts by weight per hundred parts of resin) of aluminum trihydrate, and 5 phr or 10 phr or 15 phr of the high surface area AOM with the blend of the base formula for flexible PVC resin listed in Table 2. The components of the formulation are mixed in a Waring blender mixing vessel. The flexible PVC specimens are fused using a 75-mL Brabender Plasticorder Digisystem equipped with Type 6 roller blades (3:2 speed ratio). The fusion process parameters include a mixing temperature of 160° C. and a mixing time of 5 min. The fused samples are compression-molded to a ⅛" thickness with a Carver press at 300° F. Four plaques are produced per experiment for NBS Smoke Chamber and cone calorimetry tests.

As another example, rigid PVC containing the smoke suppressant of this invention can be made by blending 20 phr (parts by weight per hundred parts of resin) of aluminum trihydrate, and 5 phr or 10 phr or 15 phr of the high surface area AOM with the blend of the base formula for rigid PVC resin listed in Table 3. The components of the formulation are mixed in a Waring blender mixing vessel. The rigid PVC specimens are fused using a 75-mL Brabender Plasticorder Digisystem equipped with Type 6 roller blades (3:2 speed ratio). The fusion process parameters include a mixing temperature of 190° C. and a mixing time of 5 min. The fused samples are compression-molded to a ⅛" thickness with a Carver press at 300° F. Four plaques are produced per experiment for NBS Smoke Chamber and cone calorimetry tests.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

EXAMPLE 1

Method for Producing AOM Treated Talc

To 400 parts deionized water is added 30 parts talc and mixed to form a slurry. 51 parts ammonium dimolybdate and 42 parts molybdenum trioxide are then added. The slurry is heated to 88° C. and held for 3 hours while stirring. The reaction of the ammonium dimolybdate and the molybdenum trioxide occurs at the elevated temperature. Water can be added during the reaction to keep the volume above the mixing blade, if necessary. After 3 hours, the slurry is filtered hot, the filtered slurry is dried at 150° C., and then the filter mass is ground in a centrifugal grinder.

EXAMPLE 2

Method for Producing AOM Treated Talc

To 400 parts deionized water is added 30 parts talc and mixed to form a slurry. 51 parts ammonium dimolybdate is added at 6 grams per minute, and then 42 parts molybdenum trioxide is added at 5 grams per minute. The slurry is heated to 88° C. and held for 3 hours while stirring. Optionally, the slurry can be cooled to 66° C. and then held for 1 hour. The reaction of the ammonium dimolybdate and the molybdenum trioxide occurs at the elevated temperature. Water can be added during the reaction to keep volume above mixing blade. After 3 hours, the hot or cooled slurry is filtered, the filtered slurry is dried at 150° C., and then the filter mass is ground in a centrifugal grinder.

The following examples demonstrate the results obtained utilizing AOM smoke suppressant PVC compounds of this invention. Plasticized flexible and rigid PVC plaques (100× 100×3 $mm^3$) containing the KG-STA are prepared and tested via the NBS smoke chamber and cone calorimetry test methods as described below. The examples are intended to be representative of the formulations that can be made and are not intended to limit the scope of the invention. All test compounds are mixed using a Brabender Plasticorder and test plaques are prepared by compression molding. The smoke generated by combustion of the PVC plaques are determined in the NBS Smoke chamber according to ASTM E662-06 "Standard Test Method for Specific Optical Density of Smoke Generated by Solid Materials", incorporated herein by reference.

Test Methods

ASTM E662 NBS Smoke Chamber

The release of smoke generated by the combustion of plastic materials can be determined using the National Bureau of Standards (NBS) smoke chamber method, standardized in the U.S. as ASTM E662-06. This test was originally developed to determine the smoke generating characteristics of plastic materials used in aircraft construction.

The NBS smoke chamber measures smoke density accumulated when a specimen of specified form and thickness is exposed to a radiant heat source of 25 $kW/m^2$. Depending on the application, either the maximum smoke density or the smoke density at a set time (usually 4 minutes) can be specified. The test can be run with or without the application of a pilot flame (flaming and smoldering mode, respectively).

ASTM E1354-04a Cone Calorimeter

The cone calorimeter is a laboratory instrument that measures combustibility and smoke generation of materials under a wide range of conditions. For building materials that must pass the E-84 Steiner Tunnel test, the cone calorimeter is often used as a screening test.

In the cone calorimeter test, described by ASTM E1354-04a "Standard Test Method for Heat and Visible Smoke Rates for Materials and Products Using an Oxygen Consumption Calorimeter," incorporated herein by reference, a square sample of 100×100 mm (4×4 in.) is exposed to the radiant flux of an electric heater. The heater has the shape of a truncated cone and is capable of providing heat fluxes in the range of 10-110 $kW/m^2$, but most typically from 50-75 $kW/m^2$. This is two to three times the heat flux used in the NBS smoke chamber.

COMPARATIVE EXAMPLES

Commercial AOM #1 and AOM #2 vs. KG-STA

Flexible PVS-NBS Smoke

The NBS Smoke results of flexible PVC are presented in FIGS. 3-8, and cone calorimeter results of flexible PVC are presented in FIG. 9. All samples are tested at total AOM content levels of 5 phr, 10 phr and 15 phr (parts per hundred PVC resin) with talc levels adjusted to maintain a fixed total filler content, and either 30 phr or 60 phr aluminum trihydrate (ATH).

The data clearly demonstrate that at all use levels and all times, the KG-STA far exceeds the performance of commercial AOM #1 and #2 samples. In terms of maximum smoke density, KG-STA shows the greatest performance advantage at the lower use levels. The results demonstrate that the performance of KG-STA at 5 phr is comparable to the performance of the best commercial AOM at 10 phr, resulting in much more efficient use of the AOM chemistry.

FIGS. 6-8 present the NBS smoke results obtained from a 60 phr ATH-containing formula. The smoke density is shown as a function of use level for the various compounds. FIG. 6 shows the 90 second smoke, FIG. 7 shows the smoke development at 4 minutes and FIG. 8 shows the maximum smoke development for the various compounds.

The results in FIG. 9 demonstrate that the performance of KG-STA again far exceeds the performance of AOM #1 at all use levels. The total smoke numbers with 5 phr KG-STA were comparable to those obtained with AOM #1 at 10 phr. Significantly, the total smoke obtained with 10 phr KG-STA was nearly the same as that obtained with 15 phr of AOM #2.

Thus, both the Cone Calorimeter and NBS Smoke results demonstrate that in flexible PVC, KG-STA offers performance advantages over commercial AOM. Depending on the system, the use of KG-STA allows for the reduction of 25% to 50% total AOM while retaining equal or better smoke suppression.

Rigid PVC-NBS Smoke

A model rigid PVC formula is selected for the comparison of KG-STA and commercial AOM. In this formula, the total filler content is fixed at 20 phr. In the negative control, the filler is made up of 8 phr of magnesium hydroxide and 12 phr talc. Smoke suppressants are studied at 6, 9, and 12 phr. In these samples, the talc level is reduced to maintain the fixed total filler level. In these examples, the comparison of KG-STA and AOM is on an equal weight basis, rather than equal AOM content. In other words, the samples with KG-STA contain only 70% of the molybdate content of the samples containing commercial AOM.

NBS results at 90 seconds, 4 minutes and the maximum smoke development are shown in FIGS. 10-12. These figures demonstrate the percent reduction in smoke when compared to a control system with no smoke suppressant (talc and $Mg(OH)_2$ as the only fillers). As can be seen in FIGS. 10-12, at all use levels and all times, KG-STA significantly outperforms both AOM smoke suppressants. Significantly, KG-STA at 6 phr exceeds the performance of the commercial AOM #2 at 12 phr. The KG-STA contains only 70% AOM based on the total weight of KG-STA (i.e., equal or enhanced performance is achieved at an AOM level 65% lower than when using the pure commercial materials).

At 90 seconds and 4 minutes, there is very little dependence on use level with KG-STA. This is in striking contrast to the commercial AOM, which definitely show increasing performance with increasing use levels. The maximum smoke density developed with KG-STA does, however, demonstrate a dependence on use level. At all levels, the reduction in smoke generation achieved with KG-STA far exceeds that of the commercial products.

Rigid PVC Cone Calorimeter

Using the same model rigid PVC formula shown above, cone calorimeter testing (ASTM E-135404a) is performed to further compare the smoke suppression effectiveness of KG-STA and the two commercial AOM materials. Product comparisons were conducted at 6 and 9 phr, with talc levels adjusted to maintain a fixed total filler level. FIG. 13 presents the total smoke generated from combustion of the various PVC samples as a function of use level.

In both NBS Smoke and Cone Calorimeter testing, KG-STA has consistently demonstrated its performance advantages over the commercial ammonium octamolybdate. Analytical results indicate that the significant performance improvements are primarily attributed to the increased surface area of KG-STA. NBS Smoke and Cone Calorimetry results demonstrate that KG-STA outperforms both AOM #1 and #2 in decreasing smoke. Thus, both commercial examples of AOM #1 and #2 can be replaced with KG-STA at equivalent or up to 50% less AOM content while retaining equal or better smoke reduction.

We claim:

1. A smoke suppressant comprising:
    a) from about 15% to about 80% by weight of an inert core material;
    b) from about 20% to about 85% by weight of ammonium octamolybdate;
    wherein the ammonium octamolybdate is obtained from an in situ reaction of ammonium dimolybdate and molybdenum trioxide;
    and wherein the in situ reaction occurs in the presence of the inert core material
    wherein the ammonium octamolybdate obtained from the in situ reaction is in the form of particles having substantially rod-shaped morphology.

2. The smoke suppressant of claim 1, wherein the inert core material is selected from the group consisting of a talc, clay, silica, and extender pigment.

3. The smoke suppressant of claim 2, wherein the talc is surface-treated with the ammonium octamolybdate.

4. The smoke suppressant of claim 1, wherein the ammonium octamolybdate is about 65% to about 80% by weight, based on the weight of the smoke suppressant, and the inert core material is about 20% to about 35% by weight, based on the weight of the smoke suppressant.

5. The smoke suppressant of claim 1, wherein the ammonium octamolybdate is about 70% to about 75% by weight, based on the weight of the smoke suppressant, and the inert core material is about 25% to about 30% by weight, based on the weight of the smoke suppressant.

6. A thermoplastic polymer composition comprising:
    a) a chlorine-containing polymer; and
    b) a smoke suppressant compound comprising:
        (a) from about 15% to about 80% by weight of an inert core material;
        (b) from about 20% to about 85% by weight of an ammonium octamolybdate;
    wherein the ammonium octamolybdate is obtained from an in situ reaction of ammonium dimolybdate and molybdenum trioxide;
    and wherein the in situ reaction occurs in the presence of the inert core material; and
    wherein the ammonium octamolybdate obtained from the in situ reaction is in the form of particles having substantially rod-shaped morphology.

7. The thermoplastic polymer composition of claim 6, wherein the polymeric formulation comprises polyvinyl chloride.

8. The thermoplastic polymer composition of claim 6, further comprising aluminum trihydrate.

9. A method of improving the smoke suppressant characteristics of a polymeric composition, comprising:
    (a) preparing a smoke suppressant material comprising:
        1. from about 15% to about 80% by weight, based on the weight of the smoke suppressant material, of an inert core material; and
        2. from about 20% to about 85% by weight, based on the weight of the smoke suppressant material, of an ammonium octamolybdate;
    wherein the ammonium octamolybdate is obtained from an in situ reaction of ammonium dimolybdate and molybdenum trioxide;
    and wherein the in situ reaction occurs in the presence of the inert core material, and wherein the ammonium octamolybdate obtained from the in situ reaction is in the form of particles having substantially rod-shaped morphology;
    (b) compounding the smoke suppressant material with a polymeric formulation.

10. The method of claim 9, wherein the polymeric formulation comprises polyvinyl chloride formulation.

11. The method of claim 9, wherein the inert core material is selected from the group consisting of talc, clay, silica, and extender pigment.

* * * * *